(12) United States Patent
Muramatsu (10) Patent No.: US 7,401,343 B2
(45) Date of Patent: Jul. 15, 2008

(54) DISK APPARATUS

(75) Inventor: Akira Muramatsu, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 355 days.

(21) Appl. No.: 11/331,349

(22) Filed: Jan. 13, 2006

(65) Prior Publication Data

US 2006/0184956 A1    Aug. 17, 2006

(30) Foreign Application Priority Data

Jan. 14, 2005    (JP)    ............................ P2005-007491

(51) Int. Cl.
    *G11B 17/04*    (2006.01)
    *G11B 33/02*    (2006.01)
(52) U.S. Cl. ...................... 720/650; 720/601
(58) Field of Classification Search ................ 720/601, 720/604, 605, 650
    See application file for complete search history.

(56) References Cited

U.S. PATENT DOCUMENTS 6,587,419 B1 *   7/2003   Aizawa et al. ............... 720/650

| 2004/0163094 | A1* | 8/2004 | Matsui et al. | ............... 720/650 |
|---|---|---|---|---|
| 2006/0179446 | A1* | 8/2006 | Bickford et al. | ............. 720/650 |
| 2006/0184956 | A1* | 8/2006 | Muramatsu | ................. 720/650 |
| 2007/0074234 | A1* | 3/2007 | Peng | .......................... 720/650 |
| 2007/0136734 | A1* | 6/2007 | Sasaki et al. | ................ 720/646 |

FOREIGN PATENT DOCUMENTS

| JP | 6-251539 A | 9/1994 |
|---|---|---|
| JP | A-6-251479 | 9/1994 |
| JP | 10-188545 | 7/1998 |

* cited by examiner

*Primary Examiner*—William J Klimowicz
(74) *Attorney, Agent, or Firm*—Morgan, Lewis & Bockius, LLP (57) ABSTRACT

A main printed board having an electronic part contiguous to an apparatus main body at inside of a cabinet made of a synthetic resin is arranged to be proximate to other side walls of a ceiling plate portion and a bottom plate portion, a static electricity preventing plate having a width wider than that of the main printed board is hung from the ceiling plate portion to be proximate to the other side walls opposedly to the main printed board, a lower end of the static electricity preventing plate is extended to a vicinity of the main printed board, projected portions are integrally projected from the ceiling plate portion 1a to be proximate to a rear portion of a tray contained at inside of the cabinet, and lower ends of the projected portions are positioned downward from an upper face of the tray.

3 Claims, 8 Drawing Sheets

PRIOR ART

FIG. 8

PRIOR ART

FIG. 9

DISK APPARATUS

BACKGROUND OF THE INVENTION

1. Field of the Invention

The present invention relates to a disk apparatus for reproducing, recording or erasing a disk of, for example, a DVD player or the like, particularly for preventing an erroneous operation by static electricity from being brought about and resolving a so-to-speak sliding down phenomenon of a disk.

2. Description of the Related Art

Figure 6:
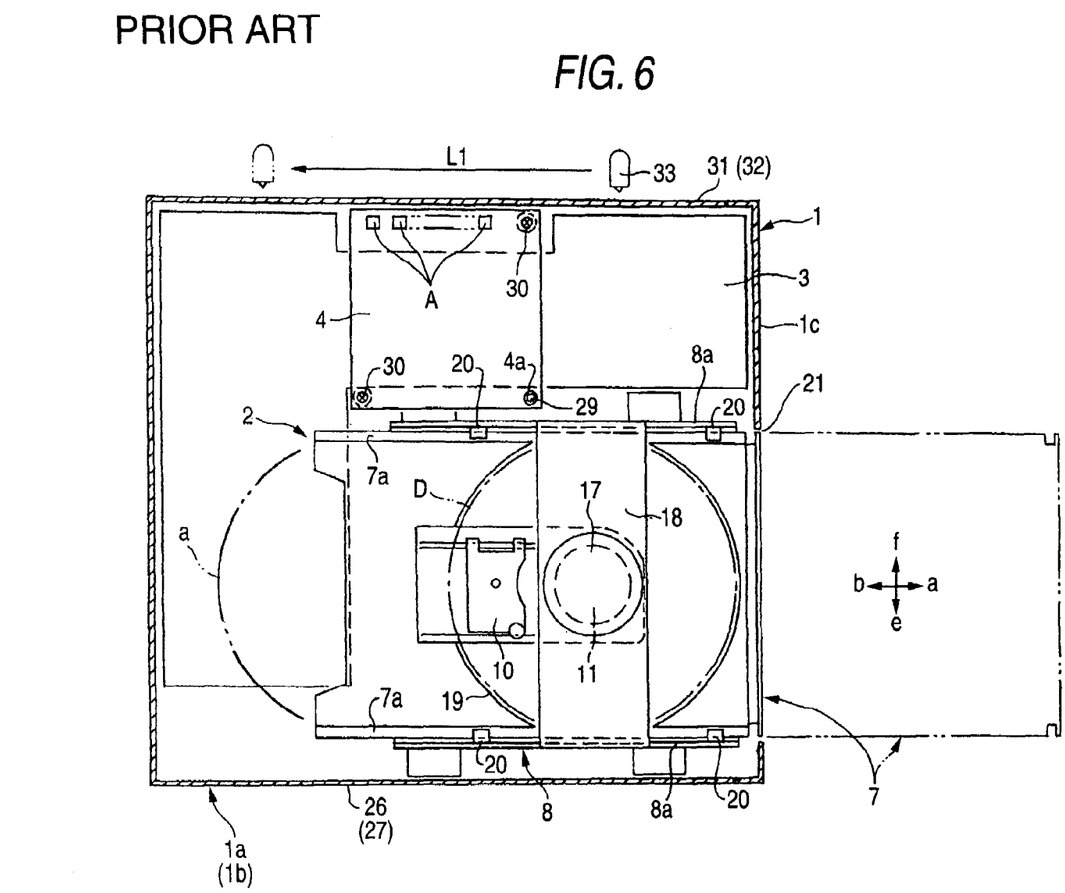
FIG. 6 is a horizontal sectional view showing an example of a background art.
Figure 7A:
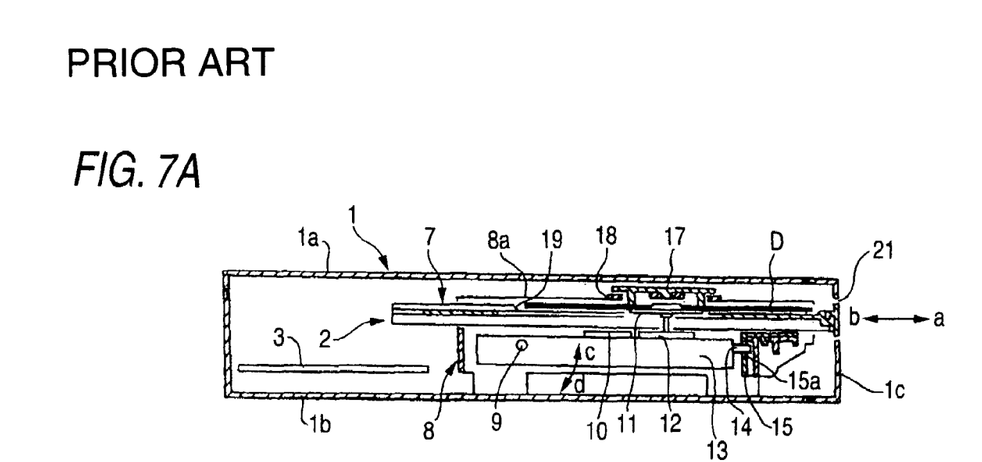
FIG. 7A is a vertical sectional view showing a play mode.
Figure 7B:
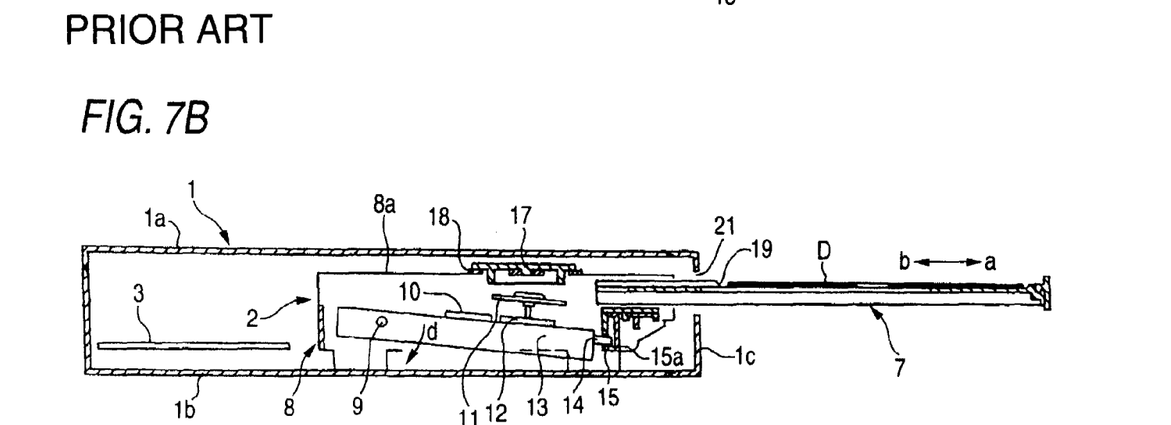
FIG. 7B is a vertical sectional view of an unloading state.
Figure 8:
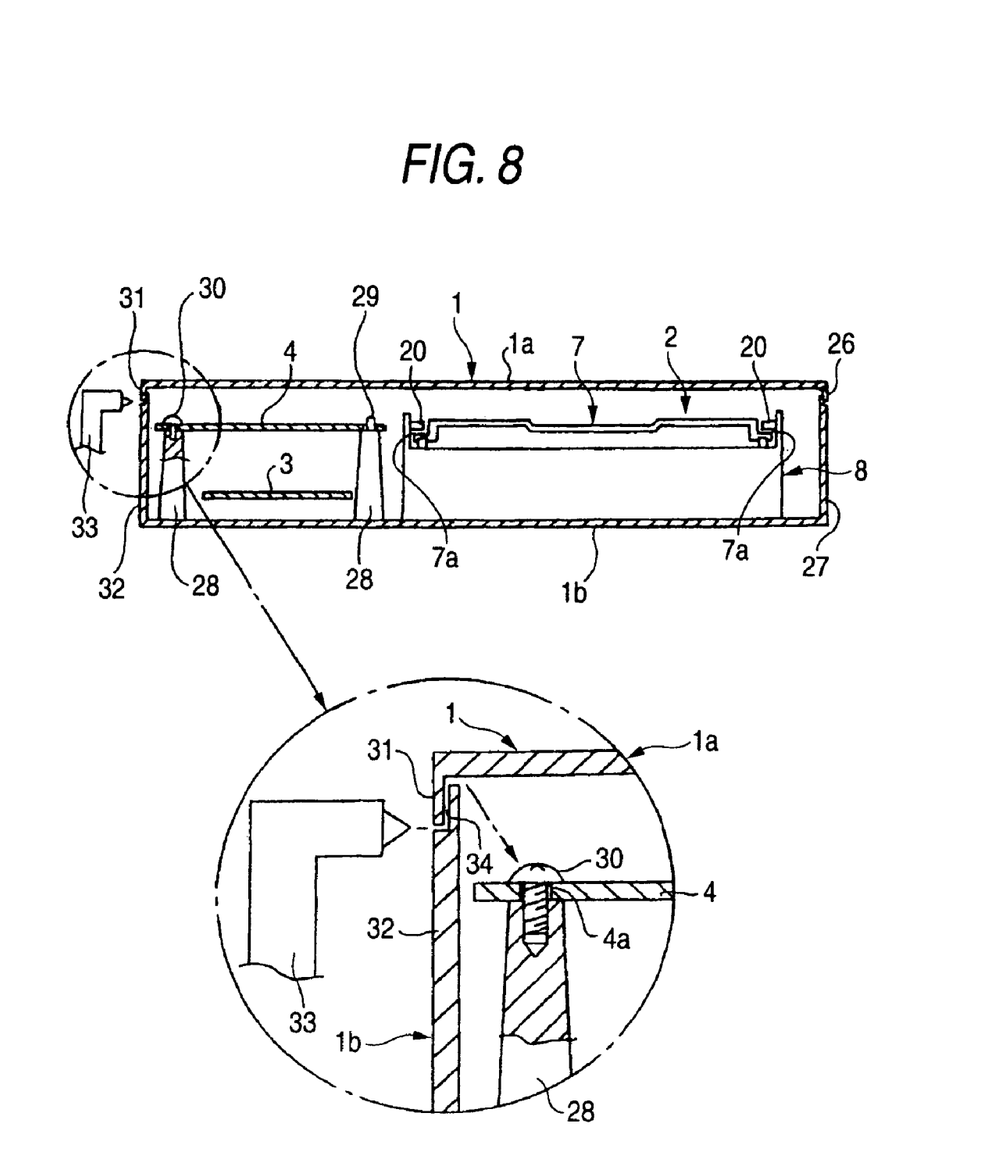
FIG. 8 is a cross-sectional view of the same.

In a background art, there is a technology of a DVD player disclosed in JP-A-6-251479 or the like, when an example thereof is explained in reference to FIG. 6 through FIG. 8, according thereto, a cabinet 1 made of a synthetic resin in a shape of a rectangular box is formed by a ceiling plate portion 1a, a bottom plate portion 1b and a front face plate portion 1c, an apparatus main body 2 is arranged at inside of a cabinet 1 to be proximate to one side walls 26, 27 of the ceiling plate portion 1a and the bottom plate portion 1b, and a periphery of the apparatus main body 2 in the cabinet 1 is arranged with an AV printed board 3 substantially in an L-like shape in plane view and a main printed board 4 having an electronic part A.

The apparatus main body 2 includes a main chassis 8 for supporting a tray 7 for mounting a disk D movably forward and rearward a, b, and an optical pickup 10 axially supported by the main chassis 8 movably upward and downward c, d centering on an axially supporting shaft 9 and a drive chassis 13 mounted with a spindle motor 12 having a turn table 11, a cam shaft 14 projected from a front face of the drive chassis 13 is fitted to a cam groove 15a of a cam slider 15, the cam slider 15 is arranged at the main chassis 8 slidably in left and right directions e, f orthogonal to forward and rearward directions a, b, and the drive chassis 13 is formed to move upward and downward c, d by sliding the cam slider 15 in the left direction e (or right direction f). Further, a disk holder 17 having a magnet opposed to the turn table 11 is arranged at a horizontal beam 18 hung between two side wall portions 8a of the main chassis 8. Further, in FIG. 6, numeral 19 designates a disk containing recess portion formed at a center portion of the tray 7, and numeral 20 designates a float up preventing piece extended from the two side wall portions 8a of the main chassis 8 to upper sides of two side edge recessed step portions 7a of the tray 7.

Explaining operation principle, a bold line of FIG. 6 and FIG. 7A show a play mode, the disk D is rotated at high speed by the spindle motor 12 by way of the turn table 11, information recorded on the disk D is read by the optical pickup 10, and an image is reproduced on a monitor.

When an unloading signal is inputted from the play mode, as shown by FIG. 7B, by moving downward d the drive chassis 13 by sliding the cam slider 15 in the left direction e (or right direction f), the disk D is delivered from the turn table 11 to the tray 7, thereafter, the tray 7 is moved forward a by passing a disk takeout port 21 of the front face plate portion 1c, the disk d is taken out from the tray 7 and a new one of the disk d is mounted onto the tray 7.

Successively, when a loading signal is inputted, as shown by FIG. 7A, after moving the tray 7 rearward b to contain at inside of the cabinet 1, by moving the drive chassis 13 upward c by sliding the cam slider 15 in the right direction f (or left direction e), the disk D on the tray 7 is pinched by the turn table 11 by the disk holder 17.

The main printed board 4 is constituted by a shape of a rectangular plate, three corner portion thereof are penetrated with inserting holes 4a, the main printed board 4 is mounted on a plurality of leg rods 28 integrally projected from a bottom face of the bottom plate portion 1b, by fitting a center inserting hole 4a to a locking pin 29 integrally projected from an upper face of the leg rods 28 and screwing screws 30 to screw holes of the respective leg rods 28 by passing the remaining two inserting holes 4a opposed to each other along a diagonal line, the main printed board 4 is fixed to the bottom plate portion 1b and is connected to the ground (grounded) by way of the screws 30.

Explaining a procedure of a static electricity test, as shown by FIG. 6 and FIG. 8, static electricity is generated while moving an electrostatic tester 33 along an outer periphery of the cabinet 1, and it is checked whether the apparatus main body 2, the AV printed board 3 and an electronic part A of the main printed board 4 are erroneously operated by the static electricity.

SUMMARY OF THE INVENTION

According to the above-described constitution, based on a request for small-sized formation of the disk apparatus, the main printed board 4 is made to be proximate to other side walls 31, 32 with a small gap (for example, about 2, 3 mm) therebetween and therefore, when the static electricity test is carried out by the electrostatic tester 33, the static electricity is shortcircuited to the screw 30 or the electronic part A by passing a gap 34 between the other side walls 31, 32 and there is a concern of erroneously operating or destructing the electronic part A.

Figure 9:
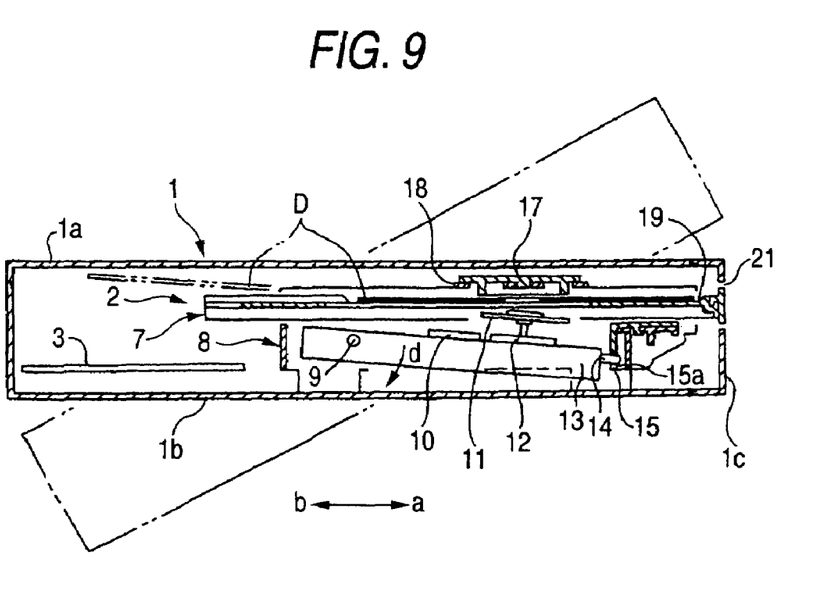
FIG. 9 is a vertical sectional view showing a state of hampering a disk from being detached of the same.

Further, as shown by a bold line in FIG. 9, when a power source is made to be OFF in a state of moving the tray 7 forward a based on the unloading signal, the drive chassis 13 is stopped in a state of being moved downward d and when the tray 7 is returned into the cabinet 1 by forcibly pressing the tray 7 to the rearward side b under the state, the turn table 11 stays to be moved down and the disk D on the tray 7 is not pinched by the turn table 11 and the disk holder 17.

In the above-described state in which the disk D is not pinched thereby, as shown by an imaginary line in FIG. 9, when the cabinet 1 is inclined to carry the cabinet 1 to, for example, other place, the disk D contained at inside of the disk containing recess portion 19 is detached to the rearward side b, as shown by a position a in FIG. 6, a rear half of the disk D is detached to be extruded from the tray 7 to bring about so-to-speak sliding down phenomenon.

When the power source is made to be ON from the state and the tray 7 is moved forward a based on the unloading signal, there is a concern that the disk D is left rearward to be dropped into the cabinet 1, or the disk D is pinched by the tray 7 moving forward a and the horizontal beam 18.

In view of the above-described drawback of the background art, it is an object of the invention to provide a disk apparatus preventing erroneous operation by static electricity from being brought about and resolving a so-to-speak sliding down phenomenon of a disk.

In order to achieve the above0-described object, according to a first aspect of the invention, there is provided a disk apparatus formed such that a cabinet made of a synthetic resin in a shape of a rectangular box is formed by a ceiling plate portion and a bottom plate portion and a front face plate portion, an apparatus main body is arranged at inside of the cabinet to be proximate to one side walls of the ceiling plate portion and the bottom plate portion, a main printed board having an electronic part contiguous to the apparatus main body at inside of the cabinet is arranged to be proximate to other side walls of the ceiling plate portion and the bottom plate portion, the apparatus main body includes a main chassis for supporting a tray for mounting a disk to be able to move forward and rearward, and a drive chassis axially supported by the main chassis to be able to be moved upward and downward and mounted with an optical pickup and a turn table, the disk is rotated by the turn table at a high speed, the disk is delivered from the turn table to the tray by moving down the drive chassis based on an unloading signal from a play mode of reading information recorded on the disk by the optical pickup, thereafter, the tray is moved forward by passing a disk takeout port of the front face plate portion, the disk is taken out from the tray and a new one of the disk is mounted on the tray, and when the drive chassis is stopped in a state of being moved downward by making a power source off and the tray is forcibly pressed to a rearward side, the tray is moved back to inside of the cabinet, wherein a static electricity preventing plate having a width wider than a width of the main printed board is hung from the ceiling plate portion to be proximate to the other side walls of the ceiling plate portion and the bottom plate portion opposedly to the main printed board, a lower end of the static electricity preventing plate is extended to a vicinity of the main printed board, a projected portion is integrally projected from the ceiling plate portion to be proximate to a rear portion of the tray contained at inside of the cabinet, and a lower end of the projected portion is positioned downward from an upper face of the tray.

According to a second aspect of the invention, there is provided a disk apparatus formed such that a cabinet made of a synthetic resin in a shape of a rectangular box is formed by a ceiling plate portion and a bottom plate portion and a front face plate portion, an apparatus main body is arranged at inside of the cabinet to be proximate to one side walls of the ceiling plate portion and the bottom plate portion, a main printed board having an electronic part contiguous to the apparatus main body at inside of the cabinet is arranged to be proximate to other side walls of the ceiling plate portion and the bottom plate portion, the apparatus main body includes a main chassis for supporting a tray for mounting a disk to be able to move forward and rearward, and a drive chassis axially supported by the main chassis to be able to be moved upward and downward and mounted with an optical pickup and a turn table, the disk is rotated by the turn table at a high speed, the disk is delivered from the turn table to the tray by moving down the drive chassis based on an unloading signal from a play mode of reading information recorded on the disk by the optical pickup, thereafter, the tray is moved forward by passing a disk takeout port of the front face plate portion, the disk is taken out from the tray and a new one of the disk is mounted on the tray, and when the drive chassis is stopped in a state of being moved downward by making a power source off and the tray is forcibly pressed to a rearward side, the tray is moved back to inside of the cabinet, wherein a static electricity preventing plate having a width wider than a width of the main printed board is hung from the ceiling plate portion to be proximate to the other side walls of the ceiling plate portion and the bottom plate portion opposedly to the main printed board, and a lower end of the static electricity preventing plate is extended to a vicinity of the main printed board.

According to a third aspect of the invention, wherein a projected portion is hung from the ceiling plate portion to be proximate to a rear portion of the tray contained at inside of the cabinet, and a lower end of the projected portion is positioned downward from an upper face of the tray in the second aspect of the invention.

According to the first aspect of the invention, a creepage distance connecting a gap between the other side walls and the main printed board is prolonged by the static electricity preventing plate and therefore, even when a static electricity test is carried out by a electrostatic tester, static electricity is not shortcircuited to the electronic part on the main printed board and also there is not a concern of erroneously operating or destructing the electronic part.

Further, even when the disk is going to be detached to the rear side from above the tray by inclining the cabinet to be carried to, for example, other place, the projected portion is hung from the ceiling plate of the cabinet to be proximate to the rear portion of the tray and therefore, the disk is not detached to the rearward side by passing over the projected portion, the lower end of the projected portion is positioned downward from the upper face of the tray and therefore, the disk is not detached to the rearward side by ducking under the projected portion, the disk can be made to stay above the tray by firmly resolving a so-to-speak sliding down phenomenon and the disk can smoothly be taken out to outside of the cabinet by moving the tray forward.

According to the second aspect of the invention, the creepage distance connecting the gap between the other side walls and the main printed board is prolonged by the static electricity preventing plate and therefore, even when the static electricity test is carried out by the static electricity tester, static electricity is not shortcircuited to the electronic part on the main printed board and there is not a concern of erroneously operating or destructing the electronic part.

According to the third aspect of the invention, even when the disk is going to be detached to the rearward side from above the tray by inclining the cabinet to be carried to, for example, other trays, the projected portion is hung from the ceiling plate portion of the cabinet to be proximate to the rear portion of the tray and therefore, the disk is not detached to the rearward side by passing over the projected portion, the lower end of the projected portion is positioned downward from the upper face of the tray and therefore, the disk is not detached to the rearward side by ducking under the projected portion, the disk can be made to stay above the tray by firmly resolving the so-to-speak sliding down phenomenon, and the disk can smoothly be taken out to outside of the cabinet by moving the tray forward.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
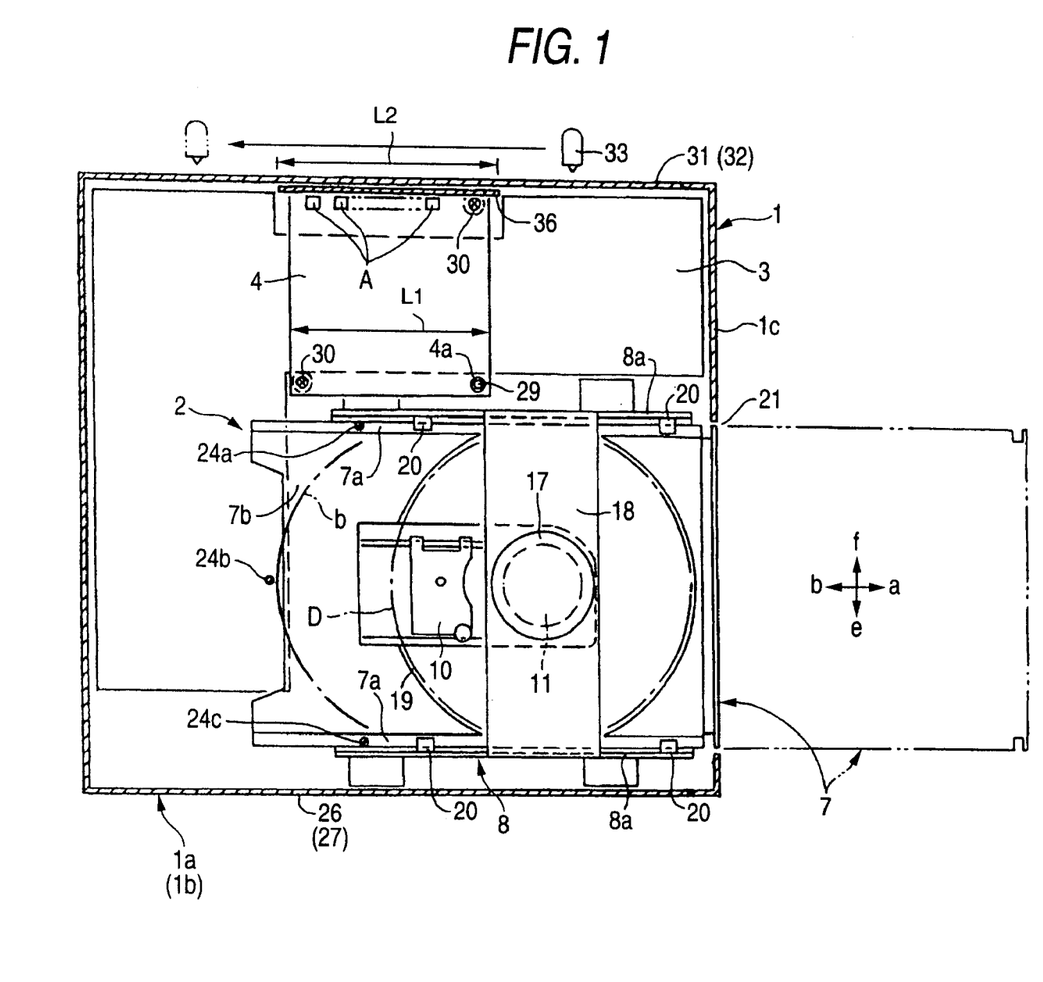
FIG. 1 is a horizontal sectional view of a disk apparatus according to an embodiment of the invention.
Figure 2:
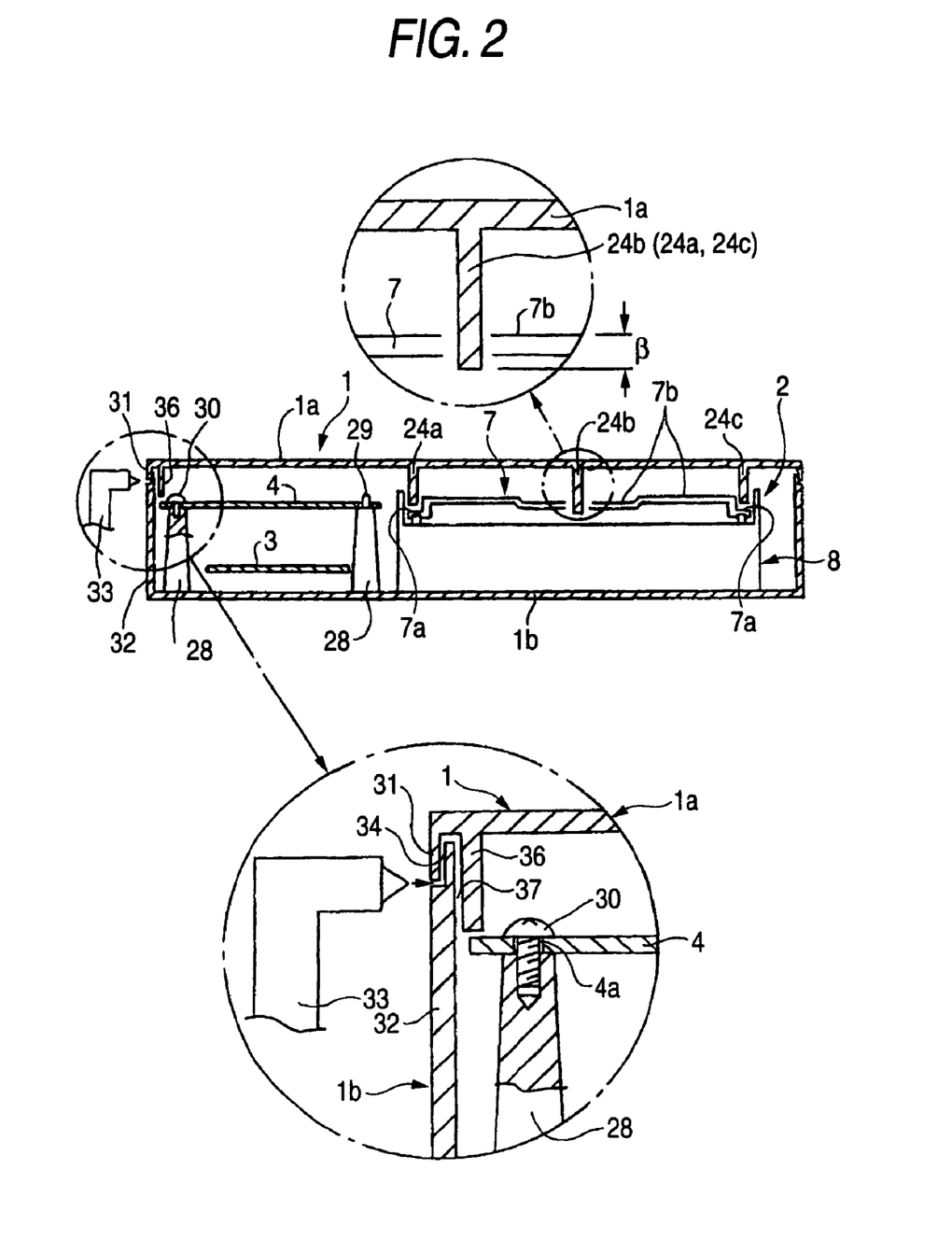
FIG. 2 is a cross-sectional view of the same.
Figure 3:
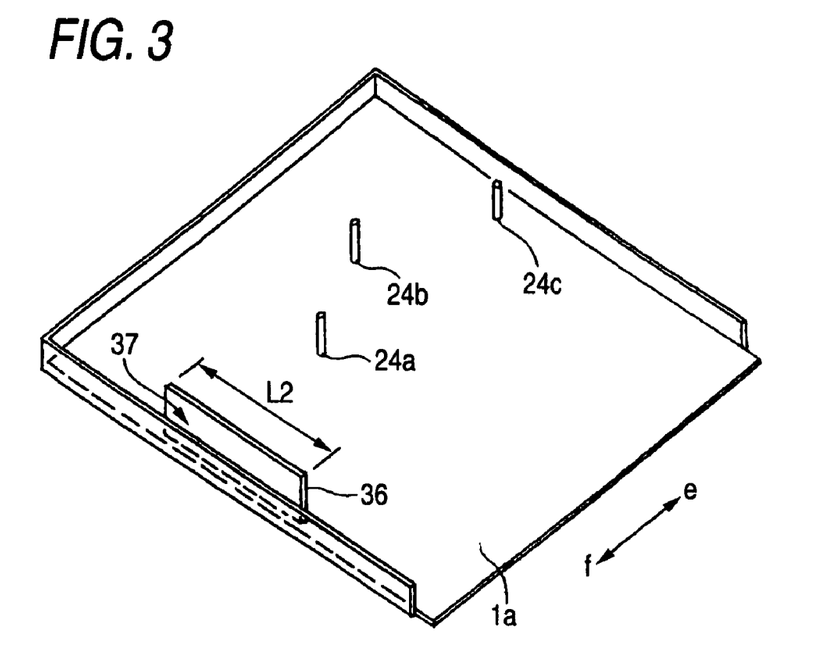
FIG. 3 is a perspective view of an essential portion of the same.

FIG. 1 through FIG. 3 show a DVD player (disk apparatus) according to the embodiment of the invention, a static electricity preventing plate 36 opposed to the main printed board 4 and having a width L2 wider than a width L1 of the main printed board 4 is hung from the ceiling plate portion 1a to be proximate to the other side walls 31, 32 and a lower end of the static electricity preventing plate 36 is extended up to a vicinity of the main printed board 4. Further, projected portions 24a through 24c are hung from a lower face of the ceiling plate portion 1a to be proximate to a rear portion of the tray 7 contained in the cabinet 1. A constitution other than the above-described is substantially the same as a constitution shown in FIG. 6 and FIGS. 7A and 7B and therefore, same portions are attached with the same notations and an explanation thereof will be omitted.

According to the above-described constitution, a creepage distance reaching the main printed board 4 by passing a slender path 37 from the gap 34 between the other side walls 31, 32 to the static electricity preventing plate 36 is prolonged and therefore, even when the static electricity test is carried out by the electrostatic tester, the static electricity is not shortcircuited to the electronic part A on the main printed board 4 and there is not a concern of erroneously operating or destructing the electronic part A.

According to the embodiment, 3 pieces of the projected portions 24a through 24c are provided along an outer peripheral edge b (refer to FIG. 1) of the disk D detached from the disk containing recess portion 19 to the rearward side b at predetermined intervals in the left and right directions e, f, the center projected portion 24b is proximate to a center portion of a rear end edge of the tray 7 to be positioned rearward therefrom, the two left and right projected portion 24a, 24c are positioned upward from two side edge recessed step portions 7a, and lower ends of the respective projected portions 24a through 24c are positioned on a lower side of an upper face 7b of the tray at a predetermined interval β therebetween.

Figure 4:
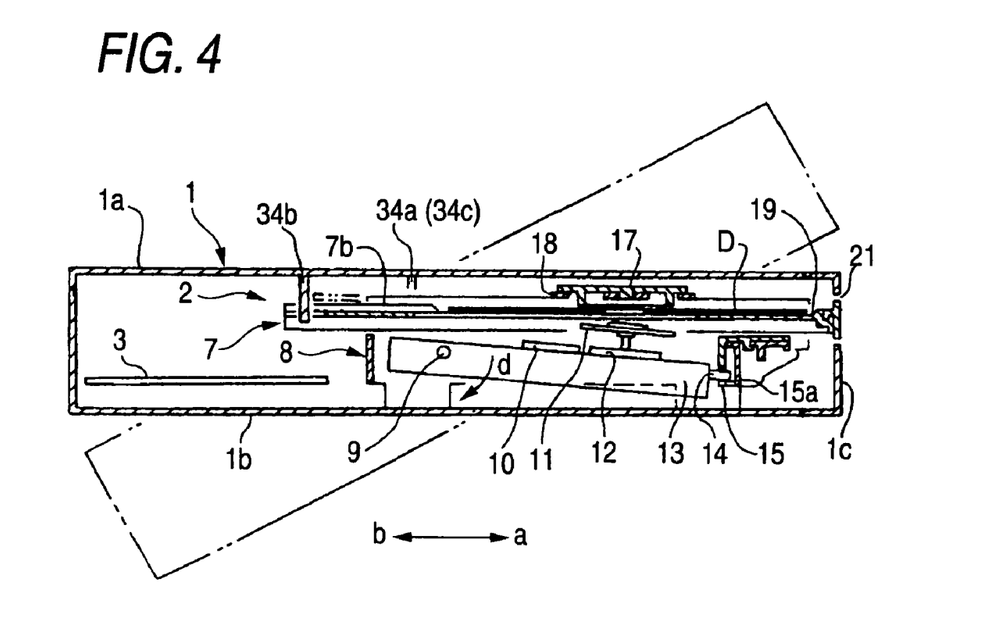
FIG. 4 is a vertical sectional view showing a state of hampering a disk from being detached of the same.
Figure 5A:
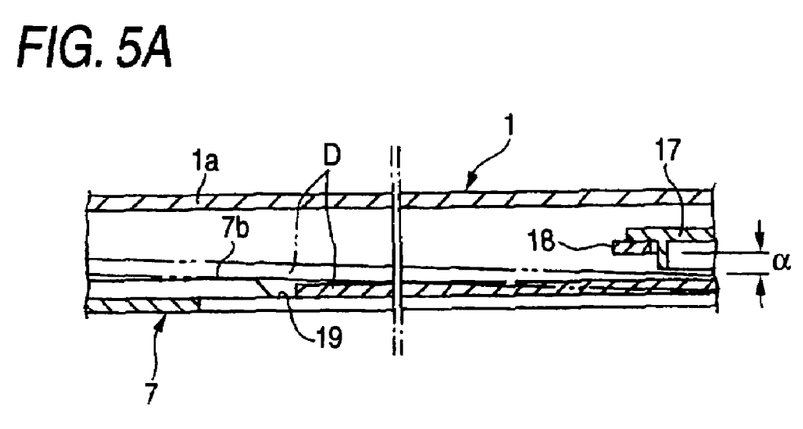
FIG. 5A is a vertical sectional view enlarging an essential portion showing a former half of detachment hampering operation of the same.
Figure 5B:
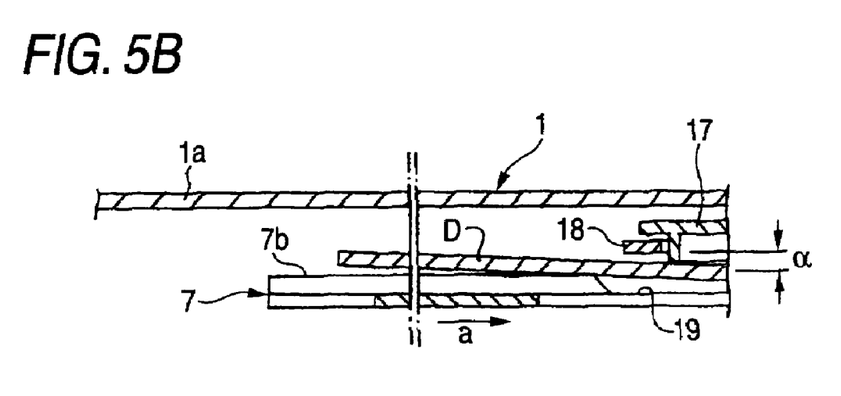
FIG. 5B is a vertical sectional view enlarging the essential portion showing a later half of the detachment hampering operation.

The operation principle is substantially the same as that of the background art shown in FIG. 6 and FIGS. 7A and 7B and therefore, an explanation thereof will be omitted. Further, as shown by FIG. 4, in the case in which by stopping the drive chassis 13 in the state of being moved downward d by making the power source OFF and forcibly pressing the tray 7 to the rearward side b by the finger, the disk D on the tray 7 is not pinched by the turn table 11 and the disk holder 17, when the cabinet 1 is inclined to be carried to, for example, other face, as shown by FIG. 5A, although the disk D contained in the disk containing recess portion 19 is detached to the rear side b, since the projected portions 24a through 24c are hung from the lower face of the ceiling plate portion 1a to be proximate to the rear portion of the tray 7, the disk. D is not detached to the rearward side b by passing over the projected portions 24a through 24c, since the lower ends of the projected portions 24a through 24c are positioned downward from the upper face 7b of the tray 7, the disk D is not detached to the rearward side b by ducking under the projected portions 24a through 24c, the disk D can be made to stay on the tray 7 by firmly resolving the so-to-speak sliding down phenomenon, as shown by FIG. 5B, when the tray 7 is moved forward a based on the unloading signal, since an interval α between the upper face 7b of the tray 7 and the horizontal beam 18 is ensured to be sufficiently larger than a thickness of the disk D and therefore, the disk D can smoothly be taken out to outside of the cabinet 1 by moving the tray 7 forward a.

Further, the projected portions 24a through 24c are formed by a synthetic resin and therefore, there is not a concern of electrically shortcircuiting the projected portions 24a through 24c and the electronic part at inside of the apparatus main body 2.

Although according to the above-described constitution, 3 pieces of the projected portions 24a through 24c are projected, only the center projected portion 24b may be made to remain by deleting the two left and right projected portions 24a, 24c.

Although according to the above-described embodiment, an explanation has been given by taking an example of the DVD player exclusive for reproduction, the invention is not limited thereto but is applicable also to various disk apparatus of, for example, a DVD recorder for reproducing, recording or erasing and the like.

What is claimed is:

1. A disk apparatus comprising:
a cabinet made of a synthetic resin in a shape of a rectangular box which is formed by a ceiling plate portion and a bottom plate portion and a front face plate portion;
an apparatus main body which is arranged at inside of the cabinet to be proximate to one side walls of the ceiling plate portion and the bottom plate portion; and
a main printed board having an electronic part contiguous to the apparatus main body at inside of the cabinet which is arranged to be proximate to other side walls of the ceiling plate portion and the bottom plate portion, wherein:
the apparatus main body includes a main chassis for supporting a tray for mounting a disk to be able to move forward and rearward, and a drive chassis axially supported by the main chassis to be able to be moved upward and downward and mounted with an optical pickup and a turn table;
the disk is rotated by the turn table at a high speed;
the disk is delivered from the turn table to the tray by moving down the drive chassis based on an unloading signal from a play mode of reading information recorded on the disk by the optical pickup, thereafter, the tray is moved forward by passing a disk takeout port of the front face plate portion, the disk is taken out from the tray and a new one of the disk is mounted on the tray, and when the drive chassis is stopped in a state of being moved downward by making a power source off and the tray is forcibly pressed to a rearward side, the tray is moved back to inside of the cabinet;
a static electricity preventing plate having a width wider than a width of the main printed board is hung from the ceiling plate portion to be proximate to the other side walls of the ceiling plate portion and the bottom plate portion opposedly to the main printed board;
a lower end of the static electricity preventing plate is extended to a vicinity of the main printed board;
a projected portion is integrally projected from the ceiling plate portion to be proximate to a rear portion of the tray contained at inside of the cabinet; and
a lower end of the projected portion is positioned downward from an upper face of the tray.

2. A disk apparatus comprising:
a cabinet made of a synthetic resin in a shape of a rectangular box is formed by a ceiling plate portion and a bottom plate portion and a front face plate portion,
an apparatus main body is arranged at inside of the cabinet to be proximate to one side walls of the ceiling plate portion and the bottom plate portion, a main printed board having an electronic part contiguous to the apparatus main body at inside of the cabinet is arranged to be proximate to other side walls of the ceiling plate portion and the bottom plate portion, wherein:

the apparatus main body includes a main chassis for supporting a tray for mounting a disk to be able to move forward and rearward, and a drive chassis axially supported by the main chassis to be able to be moved upward and downward and mounted with an optical pickup and a turn table;

the disk is rotated by the turn table at a high speed;

the disk is delivered from the turn table to the tray by moving down the drive chassis based on an unloading signal from a play mode of reading information recorded on the disk by the optical pickup, thereafter, the tray is moved forward by passing a disk takeout port of the front face plate portion, the disk is taken out from the tray and a new one of the disk is mounted on the tray, and when the drive chassis is stopped in a state of being moved downward by making a power source off and the tray is forcibly pressed to a rearward side, the tray is moved back to inside of the cabinet;

a static electricity preventing plate having a width wider than a width of the main printed board is hung from the ceiling plate portion to be proximate to the other side walls of the ceiling plate portion and the bottom plate portion opposedly to the main printed board; and a lower end of the static electricity preventing plate is extended to a vicinity of the main printed board.

3. The disk apparatus according to claim 2, wherein a projected portion is hung from the ceiling plate portion to be proximate to a rear portion of the tray contained at inside of the cabinet, and a lower end of the projected portion is positioned downward from an upper face of the tray.

* * * * *